(12) United States Patent
Prusty et al.

(10) Patent No.: US 8,563,680 B2
(45) Date of Patent: Oct. 22, 2013

(54) HEAT-AGING-RESISTANT POLYAMIDES

(75) Inventors: Manoranjan Prusty, Mannheim (DE);
Martin Baumert, Dossenheim (DE);
Bernd Bruchmann, Freinsheim (DE);
Anna Cristadoro, Heppenheim (DE)

(73) Assignee: BASF SE (DE)

( * ) Notice: Subject to any disclaimer, the term of this patent is extended or adjusted under 35 U.S.C. 154(b) by 42 days.

(21) Appl. No.: 13/157,771

(22) Filed: Jun. 10, 2011

(65) Prior Publication Data

US 2012/0010343 A1 Jan. 12, 2012

Related U.S. Application Data

(60) Provisional application No. 61/354,724, filed on Jun. 15, 2010.

(51) Int. Cl.
| C08G 65/34 | (2006.01) |
| C08G 69/14 | (2006.01) |
| C08K 5/053 | (2006.01) |
| C08K 5/06  | (2006.01) |

(52) U.S. Cl.
USPC ............ 528/425; 524/377; 524/539; 528/335

(58) Field of Classification Search
USPC .......................... 524/377, 539; 528/335, 425
See application file for complete search history.

(56) References Cited

U.S. PATENT DOCUMENTS

| 2,071,250 | A   | 2/1937  | Carothers          |
| 2,071,251 | A   | 2/1937  | Carothers          |
| 2,130,523 | A   | 9/1938  | Carothers          |
| 2,130,948 | A   | 9/1938  | Carothers          |
| 2,241,322 | A   | 5/1941  | Hanford            |
| 2,312,966 | A   | 3/1943  | Hanford            |
| 2,512,606 | A   | 6/1950  | Bolton et al.      |
| 3,393,210 | A   | 7/1968  | Speck              |
| 4,148,846 | A   | 4/1979  | Owens et al.       |
| 4,360,617 | A   | 11/1982 | Muller et al.      |
| 4,396,742 | A   | 8/1983  | Binsack et al.     |
| 4,537,949 | A   | 8/1985  | Schmidt et al.     |
| 4,540,772 | A   | 9/1985  | Pipper et al.      |
| 4,771,109 | A   | 9/1988  | Eichenauer et al.  |
| 4,873,289 | A   | 10/1989 | Lindner et al.     |
| 4,882,381 | A   | 11/1989 | Wittmann et al.    |
| 5,010,135 | A   | 4/1991  | Eckel et al.       |
| 6,194,538 | B1  | 2/2001  | Weiss et al.       |
| 6,699,960 | B1  | 3/2004  | Ohlbach et al.     |
| 2006/0235191 | A1 | 10/2006 | Deininger et al. |
| 2008/0161509 | A1* | 7/2008 | Ostrowski et al. ............ 526/64 |
| 2009/0012229 | A1 | 1/2009  | Desbois et al.     |

FOREIGN PATENT DOCUMENTS

| DE | 2702661 A1    | 8/1977  |
| DE | 3725576 A1    | 2/1989  |
| DE | 3800603 A1    | 7/1989  |
| DE | 10313681 A1   | 10/2004 |
| EP | 0038094 A2    | 10/1981 |
| EP | 0038582 A2    | 10/1981 |
| EP | 0039524 A1    | 11/1981 |
| EP | 0 050 265 A1  | 4/1982  |
| EP | 129195 A2     | 12/1984 |
| EP | 129196 A2     | 12/1984 |
| EP | 0 208 187 A2  | 1/1987  |
| EP | 235690 A2     | 9/1987  |
| EP | 299444 A2     | 1/1989  |
| EP | 0319290 A2    | 6/1989  |
| EP | 922065 A2     | 6/1999  |
| EP | 1198491 A1    | 4/2002  |
| EP | 1 424 360 A1  | 6/2004  |
| EP | 1424360 A1 *  | 6/2004  |
| EP | 1994075 A2    | 11/2008 |
| EP | 2 022 827 A1  | 2/2009  |
| WO | WO-98/08889 A2 | 3/1998 |
| WO | WO-01/09224 A1 | 2/2001 |
| WO | WO-2007101809 A2 | 9/2007 |

OTHER PUBLICATIONS

Solvay Chemicals, Webpage for Polyglycerols, retrieved on Nov. 9, 2012.*
Rajesh Kumar Kainthan, Edward B. Muliawan, Savvas G. Hatzikiriakos, and Donald E. Brooks, "Synthesis, Characterization, and Viscoelastic Properties of High Molecular Weight Hyperbranched Polyglycerols", Macromolecules 2006, 39, 7708-7717.*
Hyperpolymers webpage for Polyglycerol, retrieved on Nov. 12, 2012.*
International Search Report for PCT/EP2011/059546 dated Sep. 5, 2011.
Translation of the International Preliminary Report on Patentability for PCT/EP2011/059546 dated Jan. 4, 2013.
Hawker, C. J., et al., "Hyperbranced Poly)ethylene glycol)s: A New Class of Ion-Conducting Materials", Macromolecules, vol. 29, (1996), pp. 3831-3838.

* cited by examiner

*Primary Examiner* — Richard A Huhn
(74) *Attorney, Agent, or Firm* — Novak Druce Connolly Bove + Quigg LLP

(57) ABSTRACT

Thermoplastic molding compositions, comprising
A) from 10 to 99.99% by weight of a polyamide
B) from 0.01 to 20% by weight of a high-functionality polyetherol with an OH number of from 3 to 1350 mg KOH/g of polyetherol (to DIN 53240, part 2),
C) from 0 to 70% by weight of further additives,
where the total of the percentages by weight of components A) to C) is 100%.

12 Claims, No Drawings

HEAT-AGING-RESISTANT POLYAMIDES

CROSS-REFERENCE TO RELATED APPLICATIONS

This Application claims the benefit of U.S. Provisional Application 61/354,724 filed on Jun. 15, 2010 which is incorporated by reference.

BACKGROUND OF THE INVENTION

The invention relates to
A) from 10 to 99.99% by weight of a polyamide,
B) from 0.01 to 20% by weight of a high-functionality polyetherol with an OH number of from 3 to 1350 mg KOH/g of polyetherol (to DIN 53240, part 2)
C) from 0 to 70% by weight of further additives,
where the total of the percentages by weight of components A) to C) is 100%.

The invention further relates to the use of the molding compositions of the invention for the production of fibers, foils, and moldings of any kind, and also to the resultant moldings.

Thermoplastic polyamides, such as PA6 and PA66, are often used in the form of glassfiber-reinforced molding compositions as materials in the design of components which during their lifetime have exposure to elevated temperatures, with thermooxidative degradation. Although the thermooxidative degradation can be delayed by adding known heat stabilizers it cannot be prevented in the long term, and becomes apparent by way of example in a reduced level of mechanical properties. It is highly desirable to improve the heat-aging resistance (HAR) of polyamides, since this can achieve longer lifetimes for components subject to thermal stress, or can reduce the risk that these will fail. As an alternative, an improved HAR can also permit the use of the components at higher temperatures.

EP-A 1 424 360 discloses branched polyether/polyglycerols of different structure, these being intended to increase the flowability of thermoplastics.

The heat-aging resistance (HAR) of the known molding compositions remains inadequate, in particular over prolonged periods of thermal stress.

BRIEF SUMMARY OF THE INVENTION

The invention relates to a thermoplastic molding composition, comprising
A) from 10 to 99.99% by weight of a polyamide
B) from 0.01 to 20% by weight of a high-functionality polyetherol with an OH number of from 3 to 1350 mg KOH/g of polyetherol (to DIN 53240, part 2)
from 0 to 70% by weight of further additives.

It was therefore an object of the present invention to provide thermoplastic polyamide molding compositions which have improved HAR and have a good surface after heat-aging, and also good mechanical properties.

DETAILED DESCRIPTION OF THE INVENTION

The molding compositions defined in the introduction have accordingly been found. Preferred embodiments are given in the dependent claims.

The molding compositions of the invention comprise, as component A), from 10 to 99.99% by weight, preferably from 20 to 99.9% by weight, and in particular from 25 to 94% by weight, of at least one polyamide.

The polyamides of the molding compositions of the invention generally have an intrinsic viscosity of from 90 to 350 ml/g, preferably from 110 to 240 ml/g, determined in a 0.5% strength by weight solution in 96% strength by weight sulfuric acid at 25° C. to ISO 307.

Preference is given to semicrystalline or amorphous resins with a molecular weight (weight average) of at least 5 000, described by way of example in the following U.S. Pat. Nos. 2,071,250, 2,071,251, 2,130,523, 2,130,948, 2,241,322, 2,312,966, 2,512,606, and 3,393,210.

Examples of these are polyamides that derive from lactams having from 7 to 13 ring members, e.g. polycaprolactam, polycaprylolactam, and polylaurolactam, and also polyamides obtained via reaction of dicarboxylic acids with diamines.

Dicarboxylic acids which may be used are alkanedicarboxylic acids having 6 to 12, in particular 6 to 10, carbon atoms, and aromatic dicarboxylic acids. Merely as examples, those that may be mentioned here are adipic acid, azelaic acid, sebacic acid, dodecanedioic acid and terephthalic and/or isophthalic acid.

Particularly suitable diamines are alkanediamines having from 6 to 12, in particular from 6 to 8, carbon atoms, and also m-xylylenediamine (e.g. Ultramid® X17 from BASF SE, where the molar ratio of MXDA to adipic acid is 1:1), di(4-aminophenyl)methane, di(4-aminocyclohexyl)methane, 2,2-di(4-aminophenyl)propane, 2,2-di(4-aminocyclohexyl)-propane, and 1,5-diamino-2-methylpentane.

Preferred polyamides are polyhexamethyleneadipamide, polyhexamethylenesebacamide, and polycaprolactam, and also nylon-6/6,6 copolyamides, in particular having a proportion of from 5 to 95% by weight of caprolactam units (e.g. Ultramid® C31 from BASF SE).

Other suitable polyamides are obtainable from ω-aminoalkylnitriles, e.g. aminocapronitrile (PA 6) and adipodinitrile with hexamethylenediamine (PA 66) via what is known as direct polymerization in the presence of water, for example as described in DE-A 10313681, EP-A 1198491 and EP 922065.

Mention may also be made of polyamides obtainable, by way of example, via condensation of 1,4-diaminobutane with adipic acid at an elevated temperature (nylon-4,6). Preparation processes for polyamides of this structure are described by way of example in EP-A 38 094, EP-A 38 582, and EP-A 39 524.

Other suitable examples are polyamides obtainable via copolymerization of two or more of the abovementioned monomers, and mixtures of two or more polyamides in any desired mixing ratio. Particular preference is given to mixtures of nylon-6,6 with other polyamides, in particular nylon-6/6,6 copolyamides.

Other copolyamides which have proven particularly advantageous are semiaromatic copolyamides, such as PA 6/6T and PA 66/6T, where the triamine content of these is less than 0.5% by weight, preferably less than 0.3% by weight (see EP-A 299 444). Other polyamides resistant to high temperatures are known from EP-A 19 94 075 (PA 6T/61/MX06).

The processes described in EP-A 129 195 and 129 196 can be used to prepare the preferred semiaromatic copolyamides with low triamine content.

The following list, which is not comprehensive, comprises the polyamides A) mentioned and other polyamides A) for the purposes of the invention, and the monomers comprised:

| AB polymers: | |
|---|---|
| PA 4 | Pyrrolidone |
| PA 6 | ε-Caprolactam |
| PA 7 | Ethanolactam |
| PA 8 | Caprylolactam |
| PA 9 | 9-Aminopelargonic acid |
| PA 11 | 11-Aminoundecanoic acid |
| PA 12 | Laurolactam |
| AA/BB polymers: | |
| PA 46 | Tetramethylenediamine, adipic acid |
| PA 66 | Hexamethylenediamine, adipic acid |
| PA 69 | Hexamethylenediamine, azelaic acid |
| PA 610 | Hexamethylenediamine, sebacic acid |
| PA 612 | Hexamethylenediamine, decanedicarboxylic acid |
| PA 613 | Hexamethylenediamine, undecanedicarboxylic acid |
| PA 1212 | 1,12-Dodecanediamine, decanedicarboxylic acid |
| PA 1313 | 1,13-Diaminotridecane, undecanedicarboxylic acid |
| PA 6T | Hexamethylenediamine, terephthalic acid |
| PA 9T | 1,9-Nonanediamine, terephthalic acid |
| PA MXD6 | m-Xylylenediamine, adipic acid |
| AA/BB polymers: | |
| PA 6I | Hexamethylenediamine, isophthalic acid |
| PA 6-3-T | Trimethylhexamethylenediamine, terephthalic acid |
| PA 6/6T | (see PA 6 and PA 6T) |
| PA 6/66 | (see PA 6 and PA 66) |
| PA 6/12 | (see PA 6 and PA 12) |
| PA 66/6/610 | (see PA 66, PA 6 and PA 610) |
| PA 6I/6T | (see PA 6I and PA 6T) |
| PA PACM 12 | Diaminodicyclohexylmethane, laurolactam |
| PA 6I/6T/PACM | as PA 6I/6T + diaminodicyclohexylmethane |
| PA 12/MACMI | Laurolactam, dimethyldiaminodicyclohexylmethane, isophthalic acid |
| PA 12/MACMT | Laurolactam, dimethyldiaminodicyclohexylmethane, terephthalic acid |
| PA PDA-T | Phenylenediamine, terephthalic acid |

The molding compositions of the invention comprise, as component B), from 0.01 to 20% by weight, preferably from 0.1 to 10% by weight, and in particular from 0.1 to 1% by weight, of a high-functionality polyetherol with an OH number of from 3 to 1350, preferably from 6 to 1150, and in particular from 8 to 800, mg, and very particularly from 10 to 700 KOH/g of polyetherol (to DIN 53240, part 2).

It is preferable that the number-average molar mass ($M_n$) is from 250 to 30 000 g/mol, in particular from 350 to 15 000 g/mol, particularly preferably from 400 to 12 000 g/mol.

The glass transition temperatures $T_g$ (determined by DSC measurement; Differential Scanning calorimetry) is preferably from −30 to +100° C., in particular from 4 to 100° C.

Component B) of the invention is obtainable via a process in which at least one tri- or polyhydric alcohol and dihydric or, if appropriate, monohydric alcohols, and/or modifier reagents are reacted with the aid of acidic catalysts, where no glycerol is used as trihydric alcohol.

For the purposes of this invention, a high-functionality polyetherol is a product which has, alongside the ether groups which form the polymer skeleton, at least four, preferably at least six, particularly preferably at least ten terminal or pendant OH groups, preferably primary OH groups. The polymer skeleton here may be linear or branched. In principle, there is no upward restriction of the number of terminal or pendant functional groups, but products with a very large number of functional groups can have undesired properties, an example being high viscosity or poor solubility. The high-functionality polyetherols of the present invention mostly have no more than 500 terminal or pendant functional groups, preferably no more than 100 terminal or pendant functional OH groups. The high-functionality polyetherol of the invention is preferably the condensate derived from an average of at least 3, particularly preferably at least 4, more preferably at least 5, and in particular at least 6, di-, tri-, or polyhydric alcohols. It is further preferable here that it is the condensate derived from an average of at least 3, particularly preferably at least 4, specifically at least 5, and in particular at least 6, tri- or polyhydric alcohols.

In one preferred embodiment, the high-functionality polyethers are hyperbranched or dendrimeric polyetherols. For the purposes of this invention, hyperbranched or dendrimeric polyether polyols are uncrosslinked polymer molecules having hydroxy and ether groups, and having both structural and molecular nonuniformity. Their structure can on the one hand derive from a central molecule by analogy with dendrimers, but with nonuniform chain length of the branches. On the other hand, they can also have linear regions having functional pendant groups. For a discussion of dendrimeric and hyperbranched polymers, see also P. J. Flory, J. Am. Chem. Soc. 1952, 74, 2718 and H. Frey et al., Chem. Eur. J. 2000, 6, No. 14, 2499.

In the context of the present invention, the term "hyperbranched" means that the degree of branching (DB), i.e. the average number of dendritic linkages plus the average number of terminal groups per molecule, divided by the total of the average number of dendritic, linear, and terminal linkages, multiplied by 100, gives from 10 to 99.9%, preferably from 20 to 99%, particularly preferably from 20-95%. In the context of the present invention, the term "dendrimer" means that the degree of branching is from 99.9 to 100%. For the definition of "Degree of Branching", see H. Frey et al., Acta Polym. 1997, 48, 30.

Examples of tri- and polyhydric alcohols that can be used are triols, such as trimethylolmethane, trimethylolethane, trimethylolpropane (TMP), 1,2,4-butanetriol, tris-hydroxymethyl isocyanurate, and trishydroxyethyl isocyanurate (THEIC). It is also possible to use tetrols, such as bistrimethylolpropane (di-TMP) or pentaerythritol. It is also possible to use polyhydric polyols, such as bispentaerythritol (dipenta) or inositols. It is also possible to use alkoxylation products of the abovementioned alcohols, and also of glycerol, preferably having from 1 to 40 alkylene oxide units per molecule. The tri- and polyhydric alcohol used particularly preferably comprise aliphatic alcohols and in particular those having primary hydroxyl groups, examples being trimethylolmethane, trimethylolethane, trimethylolpropane, di-TMP, pentaerythritol, dipenta, and alkoxylates of these having from 1 to 30 ethylene oxide units per molecule, or else glycerol ethoxylates having from 1 to 30 ethylene oxide units per molecule. It is very particularly preferable to use trimethylolpropane, pentaerythritol, and ethoxylates of these having an average of from 1 to 20 ethylene oxide units per molecule, or else glycerol ethoxylates having from 1 to 20 ethylene oxide units per molecule. It is also possible to use a mixture of the abovementioned alcohols.

Compounds less suitable as trihydric and polyhydric alcohols are those bearing OH groups on two immediately adjacent carbon atoms. These compounds tend to undergo elimination reactions under conditions of the invention, and these can occur preferentially in comparison with the etherification reaction. Under etherification conditions of the invention, the unsaturated compounds that form byproducts, making the reaction product unusable in formulations that are relevant for use in industry. In particular, these byproducts occur when glycerol is used.

The tri- and polyhydric alcohols are used in a mixture of dihydric alcohols. Examples of suitable compounds having two OH groups comprise ethylene glycol, diethylene glycol, triethylene glycol, 1,2- and 1,3-propanediol, dipropylene glycol, tripropylene glycol, neopentyl glycol, 1,2-, 1,3-, and 1,4-butanediol, 1,2-, 1,3-, and 1,5-pentanediol, hexanediol, dodecanediol, cyclopentanediol, cyclohexanediol, cyclohexanedimethanol, bis(4-hydroxycyclohexyl)methane, bis(4-hydroxycyclohexyl)ethane, 2,2-bis(4-hydroxy-cyclohexyl) propane, dihydric polyether polyols based on ethylene oxide, or on propylene oxide, or on butylene oxide, or on a mixture of these, or polytetrahydrofuran. The dihydric alcohols can, of course, also be used in mixtures.

The diols serve for fine adjustment of the polyether polyol. If dihydric alcohols are used, the ratio of dihydric alcohols to the tri- and polyhydric alcohols is set by the person skilled in the art as a function of the desired properties of the polyether. The amount of the dihydric alcohol(s) is generally from 0 to 99 mol %, preferably from 0 to 80 mol %, particularly preferably from 0 to 75 mol %, and very particularly preferably from 0 to 50 mol %, based on the total amount of all of the alcohols. Block copolyethers, for example diol-terminated polyethers, can also be obtained here via alternating addition of trihydric and polyhydric alcohols and of diols during the course of the reaction.

In the invention it is also possible to precondense dihydric alcohols to give OH-terminated oligomers and then to add the trihydric or polyhydric alcohol. This method can likewise give hyperbranched polymers having linear block structures.

It is also possible to add monools in order to regulate OH functionality during or after the reaction of the trihydric and polyhydric alcohols. These monools can by way of example be linear or branched-chain aliphatic or aromatic monools. These preferably have more than 3 carbon atoms, particularly preferably more than 6. Other suitable monools are monohydric polyetherols. It is preferable to add at most 50 mol % of monool, based on the total amount of the trihydric and polyhydric alcohol.

To accelerate the reaction, acidic catalysts or catalyst mixtures are added. Examples of suitable catalysts are acids with $pK_a$ value of less than 2.2, and particular preference is given to strong acids.

Examples of acids with $pK_a$ value of less than 2.2 are phosphoric acid ($H_3PO_4$), phosphorous acid ($H_3PO_3$), pyrophosphoric acid ($H_4P_2O_7$), polyphosphoric acid, hydrogensulfate ($HSO_4^-$), sulfuric acid ($H_2SO_4$), perchloric acid, hydrochloric acid, hydrobromic acid, chlorosulfonic acid, methanesulfonic acid, trichloromethanesulfonic acid, trifluoromethanesulfonic acid, benzenesulfonic acid, and p-toluenesulfonic acid.

Other examples of acidic catalysts of the invention are acidic ion exchangers or ion-exchanger resins. Ion exchangers is the generic term used for solid substances or liquids which are capable of absorbing positively or negatively charged ions from an electrolyte solution and releasing equivalent amounts of other ions. It is preferable to use solid grains and particles where the matrix of these has been obtained via condensation (phenol-formaldehyde) or via polymerization (copolymers of styrene and divinylbenzene and also of methacrylates and divinylbenzene).

The acidic ion exchangers used in the invention bear, for example, sulfonic acid groups, carboxylic acid groups, or phosphonic acid groups. It is also possible to use ion exchangers which have a hydrophilic cellulose skeleton or are composed of crosslinked dextran or agarose, and bear acidic functional groups, e.g. carboxylmethyl groups or sulfoethyl groups. It is also possible to use inorganic ion exchangers, examples being zeolites, montmorillonites, palygorskites, bentonites, and other aluminum silicates, zirconium phosphate, titanium tungstate, and nickel hexacyanoferrate(II). In connection with ion exchangers, see also ROMPP, Chemisches Lexikon, Online Version 3.0 [Chemical Encyclopedia, Online Version 3.0], or "Ion Exchangers" by F. De Dardel and T. V. Arden, in Ullmann's Encyclopedia of Industrial Chemistry, Electronic Release 2007. Acidic ion exchangers are obtainable by way of example in solid or dissolved form as Amberlite™, Ambersept™, or Amberjet™ from Rohm and Haas.

Particularly preferred catalysts of the invention are phosphoric acid, polyphosphoric acid, chlorosulfonic acid, methanesulfonic acid, trichloromethanesulfonic acid, trifluoromethanesulfonic acid, benzenesulfonic acid, p-toluenesulfonic acid, and acidic ion exchangers.

Very particular preference is given to methanesulfonic acid, trifluoromethanesulfonic acid, p-toluenesulfonic acid, and acidic ion exchangers.

The amount added of the acid as catalyst is generally from 50 ppm to 10% by weight, preferably from 100 ppm to 5% by weight, particularly preferably from 1000 ppm to 3% by weight, based on the amount of the alcohol or alcohol mixture used.

If an acidic ion exchanger is used as catalyst, the amount used is usually from 1000 ppm to 30% by weight, preferably from 1 to 25% by weight, particularly preferably from 1 to 20% by weight, based on the amount of the alcohol or alcohol mixture used. It is, of course, also possible to use a mixture of the catalysts.

It is moreover possible to control the polycondensation reaction not only via addition of the suitable catalyst but also via selection of a suitable temperature. The constitution of the starting components and the residence time can moreover be used to adjust the average molecular weight of the polymer, and also its structure.

The reaction generally takes place at a temperature of from 0 to 300° C., preferably from 0 to 250° C., particularly preferably from 60 to 250° C., and very particularly preferably from 80 to 250° C., in bulk or in solution. In general it is possible here to use any of the solvents which are inert toward the respective starting materials. If solvent is used, it is preferable to use organic solvents, e.g. decane, dodecane, benzene, toluene, chlorobenzene, xylene, dimethylformamide, dimethylacetamide, or solvent naphtha.

In one particularly preferred embodiment, the condensation reaction is carried out in bulk, i.e. without addition of solvent. The water liberated during the reaction can be removed from the reaction equilibrium in order to accelerate the reaction, for example by using distillation, optionally at reduced pressure.

The high-functionality polyether polyols of the invention are mostly produced in the pressure range from 0.1 mbar to 20 bar, preferably from 1 mbar to 5 bar, in reactors operated batchwise, semicontinuously, or continuously.

The reaction is preferably carried out by what is known as a "one-pot method", where all of the monomer is used as initial charge and the reaction is carried out in a back-mixed reactor. However, it is also possible to conduct the reaction in a multistage reactor system, for example a stirred-tank cascade or a tubular reactor. In one preferred alternative embodiment of the present invention, the reaction can be carried out in a kneader, extruder, intensive mixer, or paddle dryer.

The reaction can also optionally be carried out with the aid of ultrasound or microwave radiation.

There are various possible ways of terminating the intermolecular polycondensation reaction. By way of example, the temperature can be lowered to a range within which the reaction ceases and the condensation product is storage-stable.

Another possibility is to deactivate the catalyst, for example via addition of a basic component, such as a Lewis base or an organic or inorganic base.

In another preferred embodiment, the polyetherols of the invention can comprise further functional groups alongside the OH groups intrinsically obtained via the reaction. These comprise mercapto groups, primary, secondary, or tertiary amino groups, ester groups, carboxylic acid groups or derivatives of these, sulfonic acid groups or derivatives of these, phosphonic acid groups or derivatives of these, silane groups, siloxane groups, aryl radicals, or short- or long-chain alkyl radicals. To this end, modifier reagents are used. These are compounds which have this type of further functional group and a group reactive toward alcohol. These groups reactive toward alcohol can by way of example be isocyanate groups, acid groups, acid derivatives, epoxy groups, or alcohol groups. These modifier reagents can be added prior to or during reaction of the tri- or polyhydric alcohols to give the high-functionality polyether.

If the tri- or polyhydric alcohol or the alcohol mixture is reacted in one step in the presence of modifier reagents, the result is a polyether polymer having randomly distributed functionalities differing from the hydroxyl groups. This type of functionalization can by way of example be achieved via addition of compounds which bear mercapto groups, primary, secondary or tertiary amino groups, ester groups, carboxylic acid groups or derivatives of these, sulfonic acid groups or derivatives of these, phosphonic acid groups or derivatives of these, silane groups, siloxane groups, aryl radicals, or short- or long-chain alkyl radicals.

For modification with mercapto groups it is possible, for example, to use mercaptoethanol. Tertiary amino groups can by way of example be produced via incorporation of alcohols containing amino groups, e.g. triethanolamine, tripropanolamine, triisopropanolamine, N-methyldiethanolamine, N-methyldipropanolamine, or N,N-dimethylethanolamine. Ester groups can be produced via addition of dicarboxylic acids, or of tricarboxylic acids, or of dicarboxylic esters, examples being adipic acid, and dimethyl terephthalate, or of tricarboxylic esters. Ester groups can also be obtained via reaction of the OH groups with lactones, specifically with caprolactone. Long-chain alkyl radicals can be introduced via reaction with long-chain alkanols or alkanediols. Reaction with alkyl or aryl isocyanates, or with the corresponding diisocyanates or oligoisocyanates generates polyethers having corresponding urethane groups.

Subsequent functionalization can be obtained by, in an additional step, reacting the resultant high-functionality, highly branched or hyperbranched polyether polyol with a suitable functionalizing reagent which can react with the OH groups of the polyether.

The high-functionality polyethers of the invention can by way of example be modified via addition of modifier reagents comprising acid groups, or comprising acyl halide groups, or comprising isocyanate groups. It is also possible by way of example to obtain polyethers comprising acid groups via reaction of the OH groups with compounds comprising anhydride groups. Ester groups can be introduced subsequently by way of example via reaction with caprolactone. The length of the ester chains here can be controlled via the amount of caprolactone used.

The high-functionality polyetherols of the invention can moreover also be converted to high-functionality polyether polyols comprising linear polyether chains with adjustable polarity, via reaction with alkylene oxides, e.g. ethylene oxide, propylene oxide, butylene oxide, or a mixture of these, as modifier reagents.

The actual choice of reaction conditions, such as pressure and temperature, and the concentration of the alcohols and optionally of the modifier reagents depends on the reactivity of the alcohols and on the modifier reagents. In principle, lower temperature, higher reactivity of the modifier reagents, and higher concentration of the modifier reagents leads to modified alcohols of low molecular weight, and higher temperature, lower concentration of modifier reagents, and lower reactivity of the modifier reagents tends to give condensates which have a plurality of di-, tri-, and polyhydric alcohols per molecule. The reaction conditions here are preferably selected in such a way that the resultant polyether polyols comprise condensates of an average of at least 3, particularly preferably at least 4, more preferably at least 5, and in particular at least 6, di-, tri-, or polyhydric alcohols. The reaction conditions are more preferably selected in such a way that the resultant high-functionality polyether polyols are condensates of an average of at least 3, particularly preferably of at least 4, more preferably at least 5, and in particular at least 6, trihydric or polyhydric alcohols. The number of the di-, tri-, or polyhydric alcohols within the condensate can by way of example be determined from the number-average molecular weight $M_n$ determined via GPC.

By virtue of the abovementioned adjustment of the reaction conditions and optionally the selection of a suitable solvent, the products of the invention can be further processed after production, without further purification.

In another preferred embodiment, the reaction product is purified via stripping, i.e. via removal of low-molecular-weight, volatile compounds. To this end, once the desired conversion has been reached, the catalyst can be deactivated. The low-molecular-weight volatile constituents, e.g. solvent, starting monomers, volatile cleavage products, volatile oligomers, or cyclic compounds, or water, are then removed by distillation, optionally with introduction of a gas, preferably nitrogen, carbon dioxide, or air, optionally at reduced pressure. In one preferred embodiment, the product is freed from volatile constituents in a thin-film evaporator.

Because of the nature of the starting monomers, it is possible that the reaction gives condensates having different structures, having branching points and cyclic units, but no crosslinking. The number of reactive groups here results from the nature of the monomers used and from the degree of polycondensation, which in the invention is to be selected in such a way that the gel point is not reached.

Products of the invention composed of TMP units can moreover comprise molecular moieties in which the OH groups of a terminal TMP unit take the form of formaldehyde acetal. The content of acetal groups can be adjusted with the aid of the reaction conditions for the polyether polyols of the invention.

The high-functionality highly branched polyethers of the invention have good solubility in various solvents, for example in water, alcohols, such as methanol, ethanol, butanol, alcohol/water mixtures, acetone, 2-butanone, ethyl acetate, butyl acetate, methoxypropyl acetate, methoxyethyl acetate, tetrahydrofuran, dimethylformamide, dimethylacetamide, N-methylpyrrolidone, ethylene carbonate, or propylene carbonate.

The molding compositions of the invention can comprise, as component C), up to 70% by weight, preferably up to 50% by weight, of further additives.

Fibrous or particulate fillers C1) that may be mentioned are carbon fibers, glass fibers, glass beads, amorphous silica, calcium silicate, calcium metasilicate, magnesium carbonate, kaolin, chalk, powdered quartz, mica, barium sulfate, and feldspar, and the amounts of these that can be used are from 1 to 50% by weight, in particular from 1 to 40% by weight, preferably from 10 to 40% by weight.

Preferred fibrous fillers that may be mentioned are carbon fibers, aramid fibers, and potassium titanate fibers, particular preference being given to glass fibers in the form of E glass. These can be used as rovings or in the commercially available forms of chopped glass.

The fibrous fillers may have been surface-pretreated with a silane compound to improve compatibility with the thermoplastic.

Suitable silane compounds have the general formula:

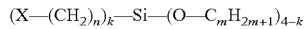

where the definitions of the substituents are as follows:
X is $NH_2-$,

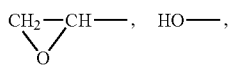

n is a whole number from 2 to 10, preferably 3 to 4,
m is a whole number from 1 to 5, preferably 1 to 2, and
k is a whole number from 1 to 3, preferably 1.

Preferred silane compounds are aminopropyltrimethoxysilane, aminobutyltrimethoxysilane, aminopropyltriethoxysilane and aminobutyltriethoxysilane, and also the corresponding silanes which comprise a glycidyl group as substituent X.

The amounts of the silane compounds generally used for surface-coating are from 0.01 to 2% by weight, preferably from 0.025 to 1.0% by weight and in particular from 0.05 to 0.5% by weight (based on C)).

Acicular mineral fillers are also suitable.

For the purposes of the invention, acicular mineral fillers are mineral fillers with strongly developed acicular character. An example is acicular wollastonite. The mineral preferably has an L/D (length to diameter) ratio of from 8:1 to 35:1, preferably from 8:1 to 11:1. The mineral filler may optionally have been pretreated with the abovementioned silane compounds, but the pretreatment is not essential.

Other fillers which may be mentioned are kaolin, calcined kaolin, wollastonite, talc and chalk, and also lamellar or acicular nanofillers, the amounts of these preferably being from 0.1 to 10%. Materials preferred for this purpose are boehmite, bentonite, montmorillonite, vermiculite, hectorite, and laponite. The lamellar nanofillers are organically modified by prior-art methods, to give them good compatibility with the organic binder. Addition of the lamellar or acicular nanofillers to the inventive nanocomposites gives a further increase in mechanical strength.

The molding compositions of the invention can comprise, as component C2), from 0.05 to 3% by weight, preferably from 0.1 to 1.5% by weight, and in particular from 0.1 to 1% by weight, of a lubricant.

Preference is given to the salts of Al, of alkali metals, or of alkaline earth metals, or esters or amides of fatty acids having from 10 to 44 carbon atoms, preferably having from 12 to 44 carbon atoms.

The metal ions are preferably alkaline earth metal and Al, particular preference being given to Ca or Mg.

Preferred metal salts are Ca stearate and Ca montanate, and also Al stearate.

It is also possible to use a mixture of various salts, in any desired mixing ratio. The carboxylic acids can be monobasic or dibasic. Examples which may be mentioned are pelargonic acid, palmitic acid, lauric acid, margaric acid, dodecanedioic acid, behenic acid, and particularly preferably stearic acid, capric acid, and also montanic acid (a mixture of fatty acids having from 30 to 40 carbon atoms).

The aliphatic alcohols can be monohydric to tetrahydric. Examples of alcohols are n-butanol, n-octanol, stearyl alcohol, ethylene glycol, propylene glycol, neopentyl glycol, pentaerythritol, preference being given to glycerol and pentaerythritol.

The aliphatic amines can be mono- to tribasic. Examples of these are stearylamine, ethylenediamine, propylenediamine, hexamethylenediamine, di(6-aminohexyl)amine, particular preference being given to ethylenediamine and hexamethylenediamine. Preferred esters or amides are correspondingly glycerol distearate, glycerol tristearate, ethylenediamine distearate, glycerol monopalmitate, glycerol trilaurate, glycerol monobehenate, and pentaerythritol tetrastearate.

It is also possible to use a mixture of various esters or amides, or of esters with amides in combination, in any desired mixing ratio.

The molding compositions of the invention can comprise, as component C3), from 0.05 to 3% by weight, preferably from 0.1 to 1.5% by weight, and in particular from 0.1 to 1% by weight, of a copper stabilizer, preferably of a Cu(I) halide, in particular in a mixture with an alkali metal halide, preferably KI, in particular in the ratio 1:4, or of a sterically hindered phenol, or a mixture of these.

Preferred salts of monovalent copper used are cuprous acetate, cuprous chloride, cuprous bromide, and cuprous iodide. The materials comprise these in amounts of from 5 to 500 ppm of copper, preferably from 10 to 250 ppm, based on polyamide.

The advantageous properties are in particular obtained if the copper is present with molecular distribution in the polyamide. This is achieved if a concentrate comprising the polyamide, and comprising a salt of monovalent copper, and comprising an alkali metal halide in the form of a solid, homogeneous solution is added to the molding composition. By way of example, a typical concentrate is composed of from 79 to 95% by weight of polyamide and from 21 to 5% by weight of a mixture composed of copper iodide or copper bromide and potassium iodide. The copper concentration in the solid homogeneous solution is preferably from 0.3 to 3% by weight, in particular from 0.5 to 2% by weight, based on the total weight of the solution, and the molar ratio of cuprous iodide to potassium iodide is from 1 to 11.5, preferably from 1 to 5.

Suitable polyamides for the concentrate are homopolyamides and copolyamides, in particular nylon-6 and nylon-6,6.

Suitable sterically hindered phenols C3) are in principle all of the compounds which have a phenolic structure and which have at least one bulky group on the phenolic ring.

It is preferable to use, for example, compounds of the formula

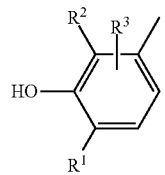

where:
$R^1$ and $R^2$ are an alkyl group, a substituted alkyl group, or a substituted triazole group, and where the radicals $R^1$ and $R^2$ may be identical or different, and $R^3$ is an alkyl group, a substituted alkyl group, an alkoxy group, or a substituted amino group.

Antioxidants of the abovementioned type are described by way of example in DE-A 27 02 661 (U.S. Pat. No. 4,360,617).

Another group of preferred sterically hindered phenols is provided by those derived from substituted benzenecarboxylic acids, in particular from substituted benzenepropionic acids.

Particularly preferred compounds from this class are compounds of the formula

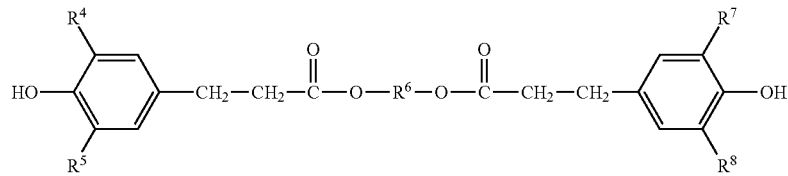

where $R^4$, $R^5$, $R^7$, and $R^8$, independently of one another, are $C_1$-$C_8$-alkyl groups which themselves may have substitution (at least one of these being a bulky group), and $R^6$ is a divalent aliphatic radical which has from 1 to 10 carbon atoms and whose main chain may also have C—O bonds.

Preferred compounds corresponding to these formulae are tert-butylphenol), 3,5-di-tert-butyl-4-hydroxybenzyldimethylamine, Compounds which have proven particularly effective and which are therefore used with preference are 2,2'-methyl-enebis(4-methyl-6-tert-butylphenol), 1,6-hexanediol bis(3,5-di-tert-butyl-4-hydroxyphenylpropionate) (Irganox® 259), pentaerythrityl tetrakis[3-(3,5-di-tert-butyl-4-hydroxyphenyl)propionate], and also N,N'-hexamethylenebis-3,5-di-tert-butyl-4-hydroxyhydrocinnamide (Irganox® 1098), and the product Irganox® 245 described above from BASF SE, which has particularly good suitability.

The amount comprised of the antioxidants C), which can be used individually or as a mixture, is from 0.05 up to 3% by weight, preferably from 0.1 to 1.5% by weight, in particular from 0.1 to 1% by weight, based on the total weight of the molding compositions A) to C).

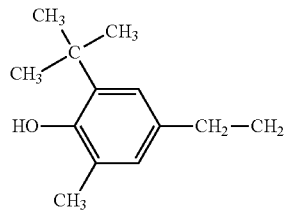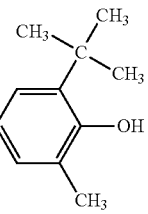

(Irganox ® 245 from BASF SE)

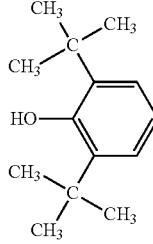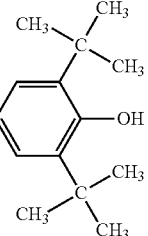

(Irganox ® 259 from BASF SE)

All of the following should be mentioned as examples of sterically hindered phenols:

2,2'-methylenebis(4-methyl-6-tert-butylphenol), 1,6-hexanediol bis[3-(3,5-di-tert-butyl-4-hydroxyphenyl)propionate], pentaerythrityl tetrakis[3-(3,5-di-tert-butyl-4-hydroxyphenyl)-propionate], distearyl 3,5-di-tert-butyl-4-hydroxybenzylphosphonate, 2,6,7-trioxa-1-phosphabicyclo[2.2.2]oct-4-ylmethyl 3,5-di-tert-butyl-4-hydroxyhydrocinnamate, 3,5-di-tert-butyl-4-hydroxyphenyl-3,5-distearylthiotriazylamine, 2-(2'-hydroxy-3'-hydroxy-3',5'-di-tert-butylphenyl)-5-chlorobenzotriazole, 2,6-di-tert-butyl-4-hydroxymethylphenol, 1,3,5-trimethyl-2,4,6-tris(3,5-di-tert-butyl-4-hydroxybenzyl)benzene, 4,4'-methylenebis(2,6-di- In some instances, sterically hindered phenols having not more than one sterically hindered group in ortho-position with respect to the phenolic hydroxy group have proven particularly advantageous; in particular when assessing color-fastness on storage in diffuse light over prolonged periods.

The molding compositions of the invention can comprise, as component C4), from 0.05 to 5% by weight, preferably from 0.1 to 2% by weight, and in particular from 0.25 to 1.5% by weight, of a nigrosin.

Nigrosins are generally a group of black or gray phenazine dyes (azine dyes) related to the indulines and taking various forms (water-soluble, oleosoluble, spirit-soluble), used in wool dyeing and wool printing, in black dyeing of silks, and in the coloring of leather, of shoe creams, of varnishes, of plastics, of stoving lacquers, of inks, and the like, and also as microscopy dyes.

Nigrosins are obtained industrially via heating of nitrobenzene, aniline, and aniline hydrochloride with metallic iron and $FeCl_3$ (the name being derived from the Latin niger=black).

Component C4) can be used in the form of free base or else in the form of salt (e.g. hydrochloride).

Further details concerning nigrosins can be found by way of example in the electronic encyclopedia Römpp Online, Version 2.8, Thieme-Verlag Stuttgart, 2006, keyword "Nigrosin".

Examples of other conventional additives C) are amounts of up to 25% by weight, preferably up to 20% by weight, of elastomeric polymers (also often termed impact modifiers, elastomers, or rubbers).

These are very generally copolymers preferably composed of at least two of the following monomers: ethylene, propylene, butadiene, isobutene, isoprene, chloroprene, vinyl acetate, styrene, acrylonitrile and acrylates and/or methacrylates having from 1 to 18 carbon atoms in the alcohol component.

Polymers of this type are described, for example, in Houben-Weyl, Methoden der organischen Chemie, Vol. 14/1 (Georg-Thieme-Verlag, Stuttgart, Germany, 1961), pages 392-406, and in the monograph by C. B. Bucknall, "Toughened Plastics" (Applied Science Publishers, London, UK, 1977).

Some preferred types of such elastomers are described below.

Preferred types of such elastomers are those known as ethylene-propylene (EPM) and ethylene-propylene-diene (EPDM) rubbers.

EPM rubbers generally have practically no residual double bonds, whereas EPDM rubbers may have from 1 to 20 double bonds per 100 carbon atoms.

Examples which may be mentioned of diene monomers for EPDM rubbers are conjugated dienes, such as isoprene and butadiene, non-conjugated dienes having from 5 to 25 carbon atoms, such as 1,4-pentadiene, 1,4-hexadiene, 1,5-hexadiene, 2,5-dimethyl-1,5-hexadiene and 1,4-octadiene, cyclic dienes, such as cyclopentadiene, cyclohexadienes, cyclooctadienes and dicyclopentadiene, and also alkenylnorbornenes, such as 5-ethylidene-2-norbornene, 5-butylidene-2-norbornene, 2-methallyl-5-norbornene and 2-isopropenyl-5-norbornene, and tricyclodienes, such as 3-methyltricyclo[5.2.1.0$^{2,6}$]-3,8-decadiene, and mixtures of these. Preference is given to 1,5-hexadiene, 5-ethylidenenorbornene and dicyclopentadiene. The diene content of the EPDM rubbers is preferably from 0.5 to 50% by weight, in particular from 1 to 8% by weight, based on the total weight of the rubber.

EPM rubbers and EPDM rubbers may preferably also have been grafted with reactive carboxylic acids or with derivatives of these. Examples of these are acrylic acid, methacrylic acid and derivatives thereof, e.g. glycidyl (meth)acrylate, and also maleic anhydride.

Copolymers of ethylene with acrylic acid and/or methacrylic acid and/or with the esters of these acids are another group of preferred rubbers. The rubbers may also comprise dicarboxylic acids, such as maleic acid and fumaric acid, or derivatives of these acids, e.g. esters and anhydrides, and/or monomers comprising epoxy groups. These monomers comprising dicarboxylic acid derivatives or comprising epoxy groups are preferably incorporated into the rubber by adding to the monomer mixture monomers comprising dicarboxylic acid groups and/or epoxy groups and having the general formulae I or II or III or IV

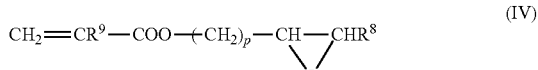

where $R^1$ to $R^9$ are hydrogen or alkyl groups having from 1 to 6 carbon atoms, and m is a whole number from 0 to 20, g is a whole number from 0 to 10 and p is a whole number from 0 to 5.

The radicals $R^1$ to $R^9$ are preferably hydrogen, where m is 0 or 1 and g is 1. The corresponding compounds are maleic acid, fumaric acid, maleic anhydride, allyl glycidyl ether and vinyl glycidyl ether.

Preferred compounds of the formulae I, II and IV are maleic acid, maleic anhydride and (meth)acrylates comprising epoxy groups, such as glycidyl acrylate and glycidyl methacrylate, and the esters with tertiary alcohols, such as tert-butyl acrylate. Although the latter have no free carboxy groups, their behavior approximates to that of the free acids and they are therefore termed monomers with latent carboxy groups.

The copolymers are advantageously composed of from 50 to 98% by weight of ethylene, from 0.1 to 20% by weight of monomers comprising epoxy groups and/or methacrylic acid and/or monomers comprising anhydride groups, the remaining amount being (meth)acrylates.

Particular preference is given to copolymers composed of from 50 to 98% by weight, in particular from 55 to 95% by weight, of ethylene, from 0.1 to 40% by weight, in particular from 0.3 to 20% by weight, of glycidyl acrylate and/or glycidyl methacrylate, (meth)acrylic acid and/or maleic anhydride, and from 1 to 45% by weight, in particular from 5 to 40% by weight, of n-butyl acrylate and/or 2-ethylhexyl acrylate.

Other preferred (meth)acrylates are the methyl, ethyl, propyl, isobutyl and tert-butyl esters.

Comonomers which may be used alongside these are vinyl esters and vinyl ethers.

The ethylene copolymers described above may be prepared by processes known per se, preferably by random copolymerization at high pressure and elevated temperature. Appropriate processes are well-known.

Other preferred elastomers are emulsion polymers whose preparation is described, for example, by Blackley in the monograph "Emulsion Polymerization". The emulsifiers and catalysts which can be used are known per se.

In principle it is possible to use homogeneously structured elastomers or else those with a shell structure. The shell-type structure is determined by the sequence of addition of the individual monomers. The morphology of the polymers is also affected by this sequence of addition.

Monomers which may be mentioned here, merely as examples, for the preparation of the rubber fraction of the elastomers are acrylates, such as n-butyl acrylate and 2-ethylhexyl acrylate, corresponding methacrylates, butadiene and isoprene, and also mixtures of these. These monomers may be copolymerized with other monomers, such as styrene, acrylonitrile, vinyl ethers and with other acrylates or methacrylates, such as methyl methacrylate, methyl acrylate, ethyl acrylate or propyl acrylate.

The soft or rubber phase (with a glass transition temperature of below 0° C.) of the elastomers may be the core, the outer envelope or an intermediate shell (in the case of elastomers whose structure has more than two shells). Elastomers having more than one shell may also have more than one shell composed of a rubber phase.

If one or more hard components (with glass transition temperatures above 20° C.) are involved, besides the rubber phase, in the structure of the elastomer, these are generally prepared by polymerizing, as principal monomers, styrene, acrylonitrile, methacrylonitrile, α-methylstyrene, p-methylstyrene, or acrylates or methacrylates, such as methyl acrylate, ethyl acrylate or methyl methacrylate. Besides these, it is also possible to use relatively small proportions of other comonomers.

It has proven advantageous in some cases to use emulsion polymers which have reactive groups at their surfaces. Examples of groups of this type are epoxy, carboxy, latent carboxy, amino and amide groups, and also functional groups which may be introduced by concomitant use of monomers of the general formula

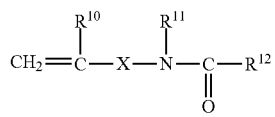

where the substituents can be defined as follows:
$R^{10}$ is hydrogen or a $C_1$-$C_4$-alkyl group,
$R^{11}$ is hydrogen, a $C_1$-$C_8$-alkyl group or an aryl group, in particular phenyl,
$R^{12}$ is hydrogen, a $C_1$-$C_{10}$-alkyl group, a $C_6$-$C_{12}$-aryl group, or —$OR^{13}$,
$R^{13}$ is a $C_1$-$C_8$-alkyl group or a $C_6$-$C_{12}$-aryl group, which can optionally have substitution by groups that comprise O or by groups that comprise N,
X is a chemical bond, a $C_1$-$C_{10}$-alkylene group, or a $C_6$-$C_{12}$-arylene group, or

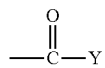

Y is O—Z or NH—Z, and
Z is a $C_1$-$C_{10}$-alkylene or $C_6$-$C_{12}$-arylene group.

The graft monomers described in EP-A 208 187 are also suitable for introducing reactive groups at the surface.

Other examples which may be mentioned are acrylamide, methacrylamide and substituted acrylates or methacrylates, such as (N-tert-butylamino)ethyl methacrylate, (N,N-dimethylamino)ethyl acrylate, (N,N-dimethylamino)methyl acrylate and (N,N-diethylamino)ethyl acrylate.

The particles of the rubber phase may also have been crosslinked. Examples of crosslinking monomers are 1,3-butadiene, divinylbenzene, diallyl phthalate and dihydrodicyclopentadienyl acrylate, and also the compounds described in EP-A 50 265.

It is also possible to use the monomers known as graft-linking monomers, i.e. monomers having two or more polymerizable double bonds which react at different rates during the polymerization. Preference is given to the use of compounds of this type in which at least one reactive group polymerizes at about the same rate as the other monomers, while the other reactive group (or reactive groups), for example, polymerize(s) significantly more slowly. The different polymerization rates give rise to a certain proportion of unsaturated double bonds in the rubber. If another phase is then grafted onto a rubber of this type, at least some of the double bonds present in the rubber react with the graft monomers to form chemical bonds, i.e. the phase grafted on has at least some degree of chemical bonding to the graft base.

Examples of graft-linking monomers of this type are monomers comprising allyl groups, in particular allyl esters of ethylenically unsaturated carboxylic acids, for example allyl acrylate, allyl methacrylate, diallyl maleate, diallyl fumarate and diallyl itaconate, and the corresponding monoallyl compounds of these dicarboxylic acids. Besides these there is a wide variety of other suitable graft-linking monomers. For further details reference may be made here, for example, to U.S. Pat. No. 4,148,846.

The proportion of these crosslinking monomers in the impact-modifying polymer is generally up to 5% by weight, preferably not more than 3% by weight, based on the impact-modifying polymer.

Some preferred emulsion polymers are listed below. Mention may first be made here of graft polymers with a core and with at least one outer shell, and having the following structure:

| Type | Monomers for the core | Monomers for the envelope |
|---|---|---|
| I | 1,3-butadiene, isoprene, n-butyl acrylate, ethylhexyl acrylate, or a mixture of these | styrene, acrylonitrile, methyl methacrylate |
| II | as I, but with concomitant use of crosslinking agents | as I |
| III | as I or II | n-butyl acrylate, ethyl acrylate, methyl acrylate, 1,3-butadiene, isoprene, ethylhexyl acrylate |
| IV | as I or II | as I or III, but with concomitant use of monomers having reactive groups, as described herein |
| V | styrene, acrylonitrile, methyl methacrylate, or a mixture of these | first envelope composed of monomers as described under I and II for the core, second envelope as described under I or IV for the envelope |

Instead of graft polymers whose structure has more than one shell, it is also possible to use homogeneous, i.e. single-shell, elastomers composed of 1,3-butadiene, isoprene and n-butyl acrylate or of copolymers of these. These products, too, may be prepared by concomitant use of crosslinking monomers or of monomers having reactive groups.

Examples of preferred emulsion polymers are n-butyl acrylate-(meth)acrylic acid copolymers, n-butyl acrylate-glycidyl acrylate or n-butyl acrylate-glycidyl methacrylate copolymers, graft polymers with an inner core composed of n-butyl acrylate or based on butadiene and with an outer envelope composed of the abovementioned copolymers, and copolymers of ethylene with comonomers which supply reactive groups.

The elastomers described may also be prepared by other conventional processes, e.g. by suspension polymerization.

Preference is also given to silicone rubbers, as described in DE-A 37 25 576, EP-A 235 690, DE-A 38 00 603 and EP-A 319 290.

It is, of course, also possible to use mixtures of the types of rubber listed above.

The thermoplastic molding compositions of the invention can comprise, as component C), conventional processing aids, such as stabilizers, oxidation retarders, agents to counteract decomposition by heat and decomposition by ultraviolet light, lubricants and mold-release agents, colorants, such as dyes and pigments, nucleating agents, plasticizers, etc. Examples of oxidation retarders and heat stabilizers are sterically hindered phenols and/or phosphites and amines (e.g. TAD), hydroquinones, aromatic secondary amines, such as diphenylamines, various substituted members of these groups, and mixtures of these, in concentrations of up to 1% by weight, based on the weight of the thermoplastic molding compositions.

UV stabilizers that may be mentioned, the amounts of which used are generally up to 2% by weight, based on the molding composition, are various substituted resorcinols, salicylates, benzotriazoles, and benzophenones.

Materials that can be added as colorants are inorganic pigments, such as titanium dioxide, ultramarine blue, iron oxide, and carbon black, and also organic pigments, such as phthalocyanines, quinacridones, perylenes, and also dyes, such as anthraquinones.

Materials that can be used as nucleating agents are sodium phenylphosphinate, aluminum oxide, silicon dioxide, and also preferably talc.

The thermoplastic molding compositions of the invention can be produced by processes known per se, by mixing the starting components in conventional mixing apparatus, such as screw-based extruders, Brabender mixers, or Banbury mixers, and then extruding the same. The extrudate can be cooled and pelletized. It is also possible to premix individual components and then to add the remaining starting materials individually and/or likewise in the form of a mixture. The mixing temperatures are generally from 230 to 320° C.

In another preferred mode of operation, components B) and also optionally C) can be mixed with a prepolymer, compounded, and pelletized. The resultant pellets are then solid-phase condensed under an inert gas continuously or batchwise at a temperature below the melting point of component A) until the desired viscosity has been reached.

The thermoplastic molding compositions of the invention feature good processability together with good mechanical properties, and also markedly improved HAR and surface.

These materials are suitable for the production of fibers, foils, and moldings of any type. Some examples follow: cylinder head covers, motorcycle covers, intake manifolds, charge-air-cooler caps, plug connectors, gearwheels, cooling-fan wheels, and cooling-water tanks.

In the electrical and electronic sector, improved-flow polyamides can be used to produce plugs, plug parts, plug connectors, membrane switches, printed circuit board modules, microelectronic components, coils, I/O plug connectors, plugs for printed circuit boards (PCBs), plugs for flexible printed circuits (FPCs), plugs for flexible integrated circuits (FFCs), high-speed plug connectors, terminal strips, connector plugs, device connectors, cable-harness components, circuit mounts, circuit-mount components, three-dimensionally injection-molded circuit mounts, electrical connectors, and mechatronic components.

Possible uses in automobile interiors are for dashboards, steering-column switches, seat components, headrests, center consoles, gearbox components, and door modules, and possible uses in automobile exteriors are for door handles, exterior-mirror components, windshield-wiper components, windshield-wiper protective housings, grilles, roof rails, sunroof frames, engine covers, cylinder-head covers, intake pipes (in particular intake manifolds), windshield wipers, and also external bodywork components.

Possible uses of improved-flow polyamides in the kitchen and household sector are for the production of components for kitchen devices, e.g. fryers, smoothing irons, knobs, and also applications in the garden and leisure sector, e.g. components for irrigation systems, or garden devices, and door handles.

EXAMPLES

The following components were used:

Component A

Nylon-6,6 with intrinsic viscosity IV of 148 ml/g, measured on a 0.5% strength by weight solution in 96% strength by weight sulfuric acid at 25° C. to ISO 307. (Ultramid® A27 from BASF SE was used.)

Component B

Production

The polymerization reaction was carried out in a 4 L four-necked flask equipped with stirrer, internal thermometer, and Vigreux column (length 20 cm, diameter 4 cm) with superposed distillation bridge with vacuum connection. The mixture made of 1250.4 g of pentaerythritol, 1393.3 g of triethylene glycol, and 6.8 g of trifluoromethanesulfonic acid was used as initial charge at room temperature (23° C.) and slowly heated, with stirring, to 180° C. by means of an oil bath. Once the reaction temperature had been reached, the pressure was reduced to 200 mbar and resultant condensate was removed by way of the distillation bridge at a transient temperature of 60° C. and collected in a round-bottomed flask. 452 g of distillate had been collected in this way after 3.5 h. The reaction mixture was then allowed to cool to 40° C. under the reduced pressure. After pressure equalization, 8 g of 5-molar ethanolic KOH were admixed with the crude product for neutralization purposes, with resultant adjustment to pH 7.2. 2.6 g of 50% strength aqueous hypophosphorous acid were then added, and pH was adjusted to 5.8. The Vigreux column was then removed, and the distillation bridge was attached directly to the reaction vessel, and the reaction mixture was then reheated to 130° C. and freed from remaining volatile constituents over a period of 4 h at a pressure of 160 mbar.

The properties of the product after cooling to 23° C. were as follows:

GPC: $M_w/M_n$=3700/520 [g/mol]

OH number: 680 mgKOH/g

GPC analysis was carried out in hexafluoroisopropanol as mobile phase with polymethyl methacrylate as standard, using a refractometer as detector.

OH number was determined to DIN 53240, part 2.

Component C/1

Glass fibers

Component C/2

Calcium stearate

Component C/3

CuI/KI in ratio 1:4 (20% strength masterbatch in PA6)

Component C/4

40% strength PA6 masterbatch with nigrosin

The molding compositions were produced in a ZSK 30 with throughput 25 kg/h and a flat temperature profile at about 280° C.

The following measurements were made:
Tensile to ISO 527, mechanical properties prior to and after heat-aging at 200° C. and 220° C. in a convection oven;
IV: c=5 g/l in 96.5% strength sulfuric acid, to ISO 307

The tables give the constitutions of the molding compositions and the results of the measurements.

TABLE 1

Components [% by weight]

| Ex. | A | B | C/1 | C/2 | C/3 | C/4 |
|---|---|---|---|---|---|---|
| 1 comp | 67.45 | — | 30 | 0.35 | 0.3 | 1.9 |
| 1 | 66.95 | 0.5 | 30 | 0.35 | 0.3 | 1.9 | comp = for comparison

TABLE 2

Mechanical properties after heat-aging, 200° C.

| Ex. No. | 0 h | 250 h | 500 h | 750 h | 1000 h |
|---|---|---|---|---|---|
| | Modulus of elasticity, MPa | | | | |
| 1 comp | 9830 | 10310 | 10420 | 10330 | 10320 |
| 1 | 9570 | 10400 | 10350 | 10200 | 10250 |
| | Tensile strength (Tensile stress at break) | | | | |
| 1 comp | 187 | 172 | 146 | 141 | 129 |
| 1 | 188 | 182 | 161 | 159 | 143 |
| | Elongation at break, % (Tensile strain at break) | | | | |
| 1 comp | 3.4 | 2.2 | 1.7 | 1.6 | 1.5 |
| 1 | 3.4 | 2.4 | 1.9 | 1.9 | 1.7 |

TABLE 3

Mechanical properties after storage at 220° C.

| Ex. No. | 0 h | 250 h | 500 h | 750 h |
|---|---|---|---|---|
| | Modulus of elasticity, MPa | | | |
| 1 comp | 9830 | 10580 | 10200 | 8400 |
| 1 | 9580 | 10400 | 10000 | 9600 |
| | Tensile strength (Tensile stress at break) | | | |
| 1 comp | 187 | 158 | 121 | 71 |
| 1 | 188 | 169 | 140 | 96 |
| | Elongation at break, % (Tensile strain at break) | | | |
| 1 comp | 3.4 | 1.9 | 1.4 | 1.0 |
| 1 | 3.4 | 2.0 | 1.6 | 1.2 |

The invention claimed is:

1. A thermoplastic molding composition, comprising
   A) from 10 to 99.99% by weight of a polyamide;
   B) from 0.01 to 20% by weight of a high-functionality hyperbranched polyetherol with an OH number of from 3 to 1350 mg KOH/g of polyetherol (to DIN 53240, part 2) wherein the degree of branching of the hyperbranched polyetherol is from 10 to 99.9%; and
   C) from 0 to 70% by weight of further additives,
   where the total of the percentages by weight of components A) to C) is not more than 100%; wherein component B) is obtained via reaction of at least one tri- or polyhydric alcohol and of further dihydric alcohols, and also optionally of further monohydric alcohols and/or modifier reagents, with the aid of acidic catalysts, where no glycerol is used as trihydric alcohol.

2. The thermoplastic molding composition according to claim 1, wherein the polyetherol B) has a number-average molar mass ($M_n$) of from 250 to 30 000 g/mol.

3. The thermoplastic molding composition according to claim 1, in which component B) has a glass transition temperature $T_g$ of from −30 to +150° C.

4. The thermoplastic molding composition according to claim 2, in which component B) has a glass transition temperature $T_g$ of from −30 to +150° C.

5. The thermoplastic molding composition according to claim 1, in which component B) comprises, alongside the ether groups which form the polymer skeleton, at least four terminal or pendant OH groups.

6. The thermoplastic molding composition according to claim 4, in which component B) comprises, alongside the ether groups which form the polymer skeleton, at least four terminal or pendant OH groups.

7. The thermoplastic molding composition according to claim 5, in which component B) has at least four primary OH groups.

8. The thermoplastic molding composition according to claim 6, in which component B) has at least four primary OH groups.

9. The thermoplastic molding composition according to claim 1, in which component B) is the condensate of an average of at least 3 di-, tri, or polyhydric alcohols.

10. The thermoplastic molding composition according to claim 8, in which component B) is the condensate of an average of at least 3 di-, tri, or polyhydric alcohols.

11. A process for the production of a fiber, a foil, or a molding which comprises utilizing the thermoplastic molding composition according to claim 1.

12. A fiber, a foil, or a molding, obtainable from the thermoplastic molding composition according to claim 1.

* * * * *